(12) United States Patent
Kashiyama

(10) Patent No.: US 6,572,415 B1
(45) Date of Patent: Jun. 3, 2003

(54) CONNECTOR HOUSING AND A MANUFACTURING METHOD THEREOF

(75) Inventor: Motohisa Kashiyama, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/691,835

(22) Filed: Oct. 18, 2000

(30) Foreign Application Priority Data

Oct. 18, 1999 (JP) .......................................... 11-295013

(51) Int. Cl.⁷ .............................................. H01R 33/00
(52) U.S. Cl. ..................... 439/682; 439/606; 439/752
(58) Field of Search .............................. 439/752, 701, 439/540.1, 606, 682

(56) References Cited

U.S. PATENT DOCUMENTS

| | | | | |
|---|---|---|---|---|
| 5,071,374 A | * | 12/1991 | Plocek et al. ............... | 439/752 |
| 5,120,269 A | * | 6/1992 | Endo et al. ................. | 439/752 |
| 5,554,038 A | * | 9/1996 | Morlion et al. .......... | 439/540.1 |
| 5,700,163 A | | 12/1997 | Okabe ........................ | 439/596 |
| 5,759,066 A | | 6/1998 | Okabe ........................ | 439/598 |

FOREIGN PATENT DOCUMENTS

EP          0 877 450 A2   11/1998

* cited by examiner

Primary Examiner—P. Austin Bradley
Assistant Examiner—Briggitte R. Hammond
(74) Attorney, Agent, or Firm—Armstrong, Westermann & Hattori, LLP

(57) ABSTRACT

A connector housing and a manufacturing method thereof are provided, which connector housing includes: an outside wall having an upper and lower walls and sidewalls; horizontal partition and vertical partition which form terminal accommodating chambers 9 inside the outside wall; and a thin sidewall portion 6 formed on each of the sidewalls and being thinner than a remaining portion of the corresponding sidewall, wherein a short shot preventing rib 8 is longitudinally formed on the thin sidewall portion integrally therewith in a generally vertical center thereof. The short shot preventing rib 8 projects outside over the remaining portion 7 continuing from the thin sidewall portion 6. The short shot preventing rib 8 is arranged in a line with the horizontal partition 15. The short shot preventing rib 8 is formed thicker than the horizontal partition 15. And, the manufacturing method includes the steps of: setting a mold for molding a connector housing 1 which has a short shot preventing rib 8 on each of thin sidewall portions 6 formed on both side walls 5; arranging a gate of a runner 3 at a position corresponding to an outside wall of the connector housing; and injecting a melted resin material into the mold through the gate for forming the connector housing 1.

6 Claims, 4 Drawing Sheets

CONNECTOR HOUSING AND A MANUFACTURING METHOD THEREOF

BACKGROUND OF THE INVENTION

1. Field of the Invention

The present invention relates to a connector housing having a shape to prevent short shot of resin material to partitions and sidewall portions of a terminal accommodating chamber and also to a manufacturing method of the connector housing.

2. Description of the Related Art

FIG. 8 shows an example of a prior art connector housing.

A connector housing 31 is formed of synthetic resin has a plurality of terminal accommodating chambers 32 arranged in two steps. The terminal accommodating chambers 32 are sectioned with vertical partitions 33, horizontal partitions 34, upper and lower wall portions 35,36, and right and left wall portions 37,38.

A terminal 39 is inserted into each of the terminal accommodating chambers 32 through respective rear openings and is primarily engaged by means of a resilient engaging lance (not shown) arranged inside the terminal accommodating chamber 32. The terminal 39 has, in the front half, a boxlike electrically contacting portion 41 having inside a spring portion 40 for contact and a wire pressure-welding portion 42 in the rear half. The terminal 39 of this example is a female type, and a male type terminal (not shown) is accommodated in a connector housing 31.

The connector housing 31 is integrally provided, through long hinges 44, with top and bottom pair of rear holders 43 for secondary engaging the terminal 39. Each of the rear holders 43 has an engaging projection 45 for engaging the terminal. And, the rear holders 43 are inserted into the connector housing 31 through respective rear openings 46. The engaging projection 45 enters inside terminal accommodating chamber 32 so as to engage a rear end 41a of the electrically contacting portion 41 of the terminal 39. As described above, the terminal 39 is double locked by means of the engaging lance and the engaging projection 45. The hinges 44 are accommodated inside the openings 46.

The connector housing 31 is formed by injecting a melted resin material into an unshown metal mold and cooling down the resin material. At the same time, the rear holders 43 and the hinges 44 are integrally formed therewith.

With respect to the above connector housing 31 and the manufacturing method thereof, however, especially in case the pitch between the terminals 39 has to be small, thickness of the partitions 33,34 is partially likely to become less than a defined one because of a short shot in the injection molding, because the vertical partitions 33 and the horizontal partitions 34 have to be thin, thereby causing the rare-short due to poor insulation between the terminals.

And, there could be a case of thinly making the sidewalls 37,38 for downsizing the connector housing 31, and also thickness of the sidewalls 37,38 is likely to become less than a determined one, also thereby causing the rare-short due to poor insulation between the terminals and the outside of the housing 31.

Besides, the rear half portions of the sidewalls 37,38 have to be thinly made because a space for accommodating the hinges 44 have to be arranged, which also brings about the short shot in the injection molding of the sidewalls 37,38.

SUMMARY OF THE INVENTION

In view of the foregoing, an object of the present invention is to provide a connector housing and a manufacturing method thereof, wherein a short shot on partitions and sidewall portions of a connector housing in the resin-molding can be securely prevented so as to secure a defined thickness of the partitions and the sidewall portions.

In order to achieve the above-described object, as a first aspect of the present invention, a connector housing comprises: an outside wall having an upper and lower walls and sidewalls; horizontal partition and vertical partition which form terminal accommodating chambers inside the outside wall; and a thin sidewall portion formed on each of the sidewalls and being thinner than a remaining portion of the corresponding sidewall, wherein a short shot preventing rib is longitudinally formed on the thin sidewall portion integrally therewith in a generally vertical center thereof.

As a second aspect of the present invention, in the structure with the above first aspect, the short shot preventing rib projects outside over the remaining portion continuing from the thin sidewall portion.

As a third aspect of the present invention, in the structure with the above first or second aspect, the short shot preventing rib is arranged in a line with the horizontal partition.

As a fourth aspect of the present invention, in the structure with the above third aspect, the short shot preventing rib is formed thicker than the horizontal partition.

As a fifth aspect of the present invention, a manufacturing method of connector housing comprises the steps of: setting a mold for molding a connector housing which has a short shot preventing rib on each of thin sidewall portions formed on both side walls; arranging a gate of a runner at a position corresponding to an outside wall of the connector housing; and injecting a melted resin material into the mold through the gate for forming the connector housing, wherein the short shot preventing rib is formed on each of the thin sidewall portions integrally therewith.

According to the above-described structure of the present invention, the following advantages are provided.

(1) In the injection molding, because the melted resin material flows from the thick sidewall portion side to the rib side, the thin sidewall portion is securely filled up with the resin material. Therefore, the short shot on the thin sidewall portions can be prevented and the insulation between the terminals in the terminal accommodating chambers and the outside can be secured, thereby preventing the rare-short. And, because the melted resin material is introduced from the rib side toward the horizontal partitions and further is introduced from the horizontal partitions to the vertical partitions, the short shot on the portions and on the partitions can be prevented. Therefore, the insulation among the terminals in the accommodating chambers can be secured, thereby preventing the rare-short.

(2) After the melted resin material has flown into the thick sidewall portion, a flow of the resin material to the rib side increases, thereby improving the above effect.

(3) Because the resin material smoothly flows into the horizontal partition from the rib side, the horizontal partition and the vertical partition can be securely filled up with the resin material.

(4) Because a cross section of the rib is large, quantity and velocity of the resin material flown into the rib increase, thereby further improving the above effects.

The above and other objects and features of the present invention will become more apparent from the following description taken in conjunction with the accompanying drawings.

DESCRIPTION OF THE PREFERRED EMBODIMENT(S)

An embodiment of the present invention will now be described in further detail with reference to the accompanying drawings.

FIGS. 1–5 show an embodiment of a connector housing and a manufacturing method thereof in accordance with the present invention.

Figure 1:
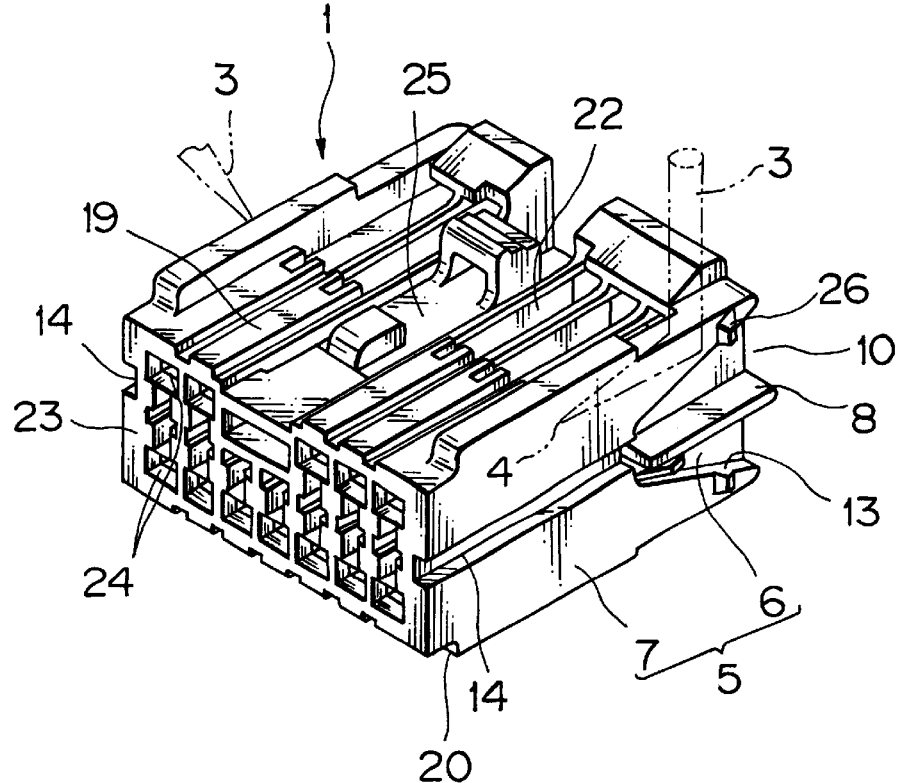
FIG. 1 is a perspective view showing an embodiment of a connector housing, in a state of being resin-molded, in accordance with the present invention.
Figure 2:
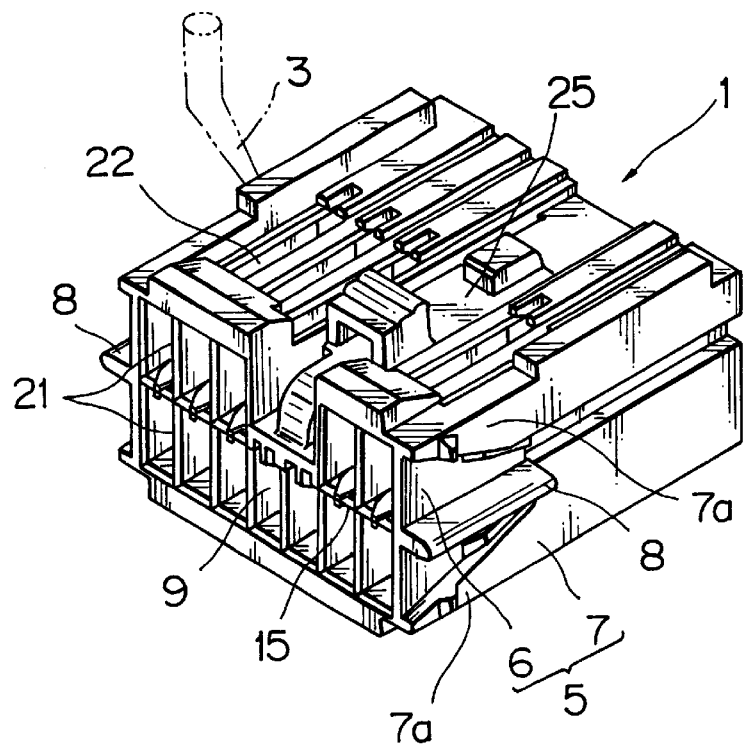
FIG. 2 is a rear-perspective view of the connector housing of FIG. 1.
Figure 3:
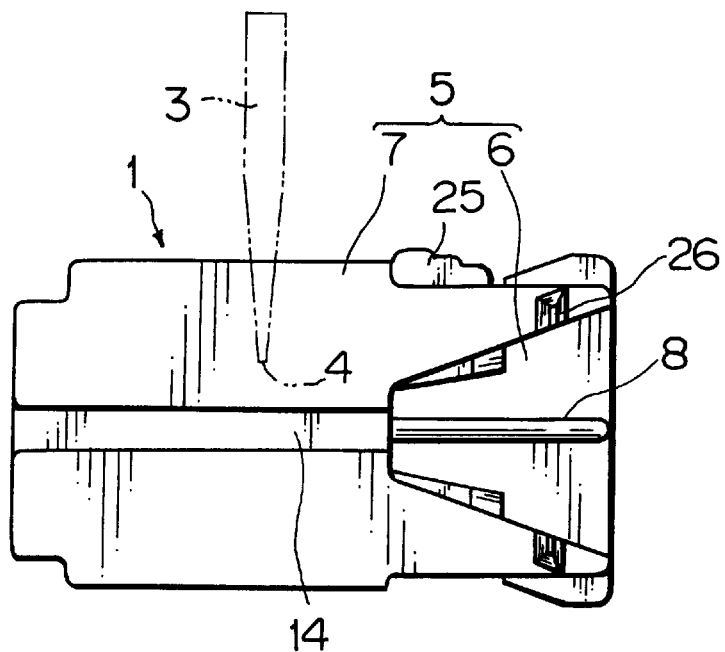
FIG. 3 is a side view showing the connector housing.
Figure 4:
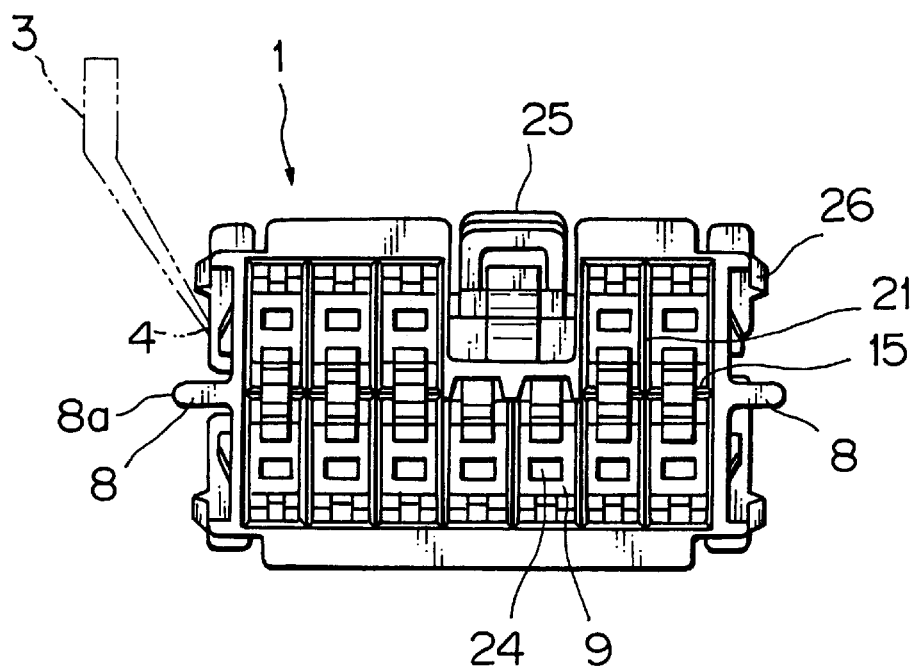
FIG. 4 is a front view showing the connector housing.
Figure 5:
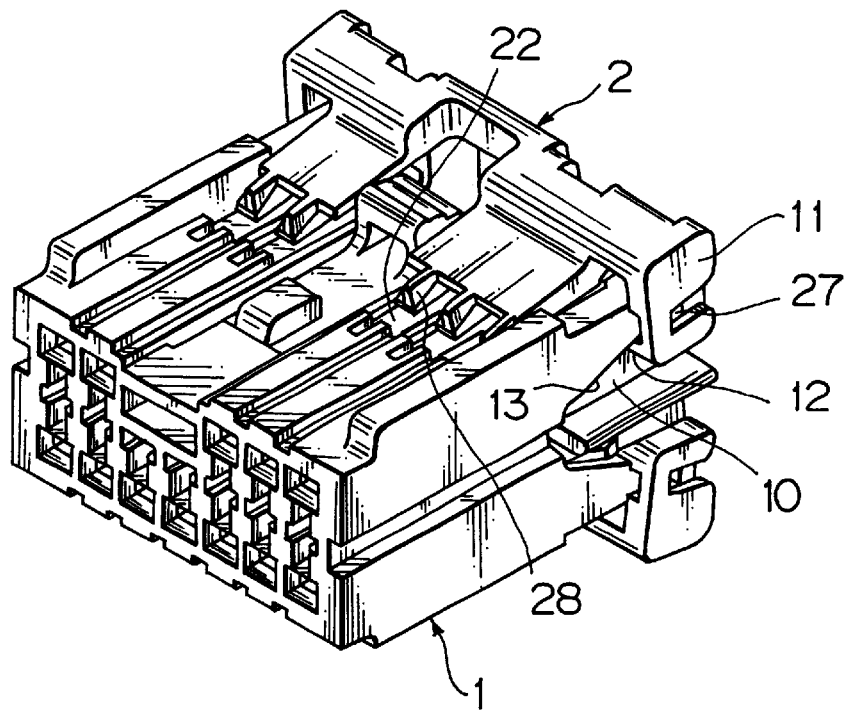
FIG. 5 is a perspective view showing a state of provisional engagement of a rear holder with the connector housing.

FIG. 1 is a perspective view of a connector housing 1; FIG. 2 is a rear-perspective view of the connector housing 1; FIG. 3 is a side view of the connector housing 1; FIG. 4 is a front view of the connector housing 1; and FIG. 5 is a perspective view showing a state of provisional engagement of a rear holder 2, for secondary engagement of a terminal, with the connector housing 1.

In FIGS. 1–4 a runner 3 to inject melted resin material is shown with a dot-dash-line. In the present embodiment a gate 4 provided at the end of the runner 3 is positioned on each of sidewalls (i.e. outside walls) 5 of the connector housing 1 at almost the longitudinal middle thereof and in an upper portion thereof. The runner 3 is set, for example, at a joint of metal molds (not shown).

The connector housing 1 has a thin sidewall portion 6 on the rear half thereof. And, a short shot preventing rib 8, i.e. a rectangular tabular projecting portion, is outwardly provided integrally with the connector housing 1 on the thin sidewall portion 6 at the vertical center of the thin sidewall portion 6. The rib 8 is continuously formed over the length of the thin sidewall portion 6 in parallel with terminal accommodating chambers 9 (FIG. 2) in the connector housing 1.

A thick sidewall portion 7 is also formed on each side of the connector housing 1. The thick sidewall portion 7 has upper and lower portions 7a (FIG. 2) continuing from the thin sidewall portion 6. A recess 10 (FIG. 1) in generally a triangle shape is formed on the thin sidewall portion 6. As shown in FIG. 5, a claw portion 12 on a sidewall 11 of the rear holder 2 enters the recess 10 and is guided along an inclined plane 13 thereof, which rear holder 2 is provided for secondary locking the terminals. The sidewall 5 of the connector housing 1 consists of the thin sidewall portion 6 and the thick sidewall portion 7.

The short shot preventing rib 8 is protrusively-provided horizontally at a right angle with an outside surface of the thin sidewall portion 6 and is higher than an outside surface of the thick sidewall portion 7. Because the short shot preventing rib 8 projects over the outside surface of the thick sidewall portion 7, the melted resin material can be introduced toward the thin sidewall portion 6 in the injection molding, thereby preventing a short shot (i.e. an insufficient filling) on the thin sidewall portion 6.

And, at the vertical center, or around it, of the thick sidewall portion 7, a groove 14 starting from the rib 8 is formed straight. The groove 14 works to concentrate the melted resin material onto the rib 8 side by preventing the melted resin material from concentrating onto the thick sidewall portion 7 side in the injection molding.

The rib 8 continues in a line from the horizontal partition 15 (FIG. 2) of the connector housing 1 through the thin sidewall portion 6. A horizontal center lines of the horizontal partition 15 and of the rib 8 agree each other. A thickness of the rib 8 is larger than that of the horizontal partition 15 so that the resin material is introduced to the rib 8 with precedence. The end 8a (FIG. 4) of the rib 8 curves smoothly in an arc so that filling up of the resin material to the rib 8 can be smooth.

In the injection molding, the resin material flows from the thick sidewall portion 7 side to the rib 8 side, whereby the resin material completely fills up the thin sidewall portion 6, is introduced from the rib 8 side toward the upper and lower wall portions 19,20 (FIG. 1) and the horizontal partitions 15 (FIG. 2), and further is introduced into the vertical partitions 21 (FIG. 2) of the terminal accommodating chambers 9. Like this, the short shot on the thin sidewall portions 6 and on the partitions 15,21 can be prevented by means of forming the ribs 8, and the thin sidewall portions 6 and the partitions 15,21 are formed in the respective defined thicknesses.

The connector housing 1 is characterized in that the short shot of the partitions 15,21 and the thin sidewall portions 6 in the resin molding can be prevented.

Even if a connector housing (not shown) has not a rear holder, a short shot preventing rib can be provided. And, in case of a connector housing (not shown) having a rear holder (not shown) corresponding to three or more steps (or layers) of terminal accommodating chambers, pairs of short shot preventing ribs 8 can be provided correspondingly to a plurality of horizontal partitions 15 (cf. FIG. 2). For example, in case three steps of the terminal accommodating chambers are provided, two pairs of short shot preventing ribs 8 are formed on the right and left thin sidewall portions of the connector housing, continuing from the upper and lower horizontal partitions, whereby the short shot on the thin sidewall portions and on the horizontal and vertical partitions can be prevented by means of the ribs.

Hereinafter, structure of the connector housing 1 of FIGS. 1–4 and of the rear holder 2 of FIG. 5 is described in detail.

The opening 22 to receive the rear holder 2 (FIG. 5) is provided on each of the rear halves of the respective upper and lower wall portions 19,20 (FIG. 1) of the connector housing 1, and the openings 22 continue from the terminal accommodating chambers 9 (FIG. 2). A conventional female type terminal (not shown) is used, which terminal is inserted into the terminal accommodating chamber 9 through an rear opening thereof and is primarily locked by a resilient engaging lance (not shown).

On a front end wall 23 (FIG. 1) of the connector housing 1, small openings 24 continuing from the terminal accommodating chambers 9 are formed. Male type terminals (not shown) of a mating female type connector housing are inserted into the openings 24. A resilient locking arm 25 for the mating connector housing is provided on the upper wall 19 of the connector housing 1.

Provisionally engaging projections 26 (FIG. 1) for the rear holders 2 (FIG. 5) are provided at a rear end side of the thick sidewall portion 7, and provisionally engaging holes 27 for the provisionally engaging projections 26 are provided on the sidewalls 11 of the rear holder 2 (FIG. 5). An inwardly-facing claw portion 12 is provided at the front end of each of the sidewalls 11 of the rear holder 2 as shown in FIG. 5, which claw portion 12 can slide along an inclined plane 13 of the recess 10 so that the pair of rear holders 2 are obliquely inserted into the respective openings 22 from an upper side and a bottom side, respectively. Engaging projections 28 to secondary engage the terminals are provided on the front end of the rear holder 2. Though the rear holders 2 are separately formed from the connector housing 1, rear holders may be connected integrally with the connector housing 1 by means of long hinges (not shown) similarly to the above-described prior art.

Figure 6:
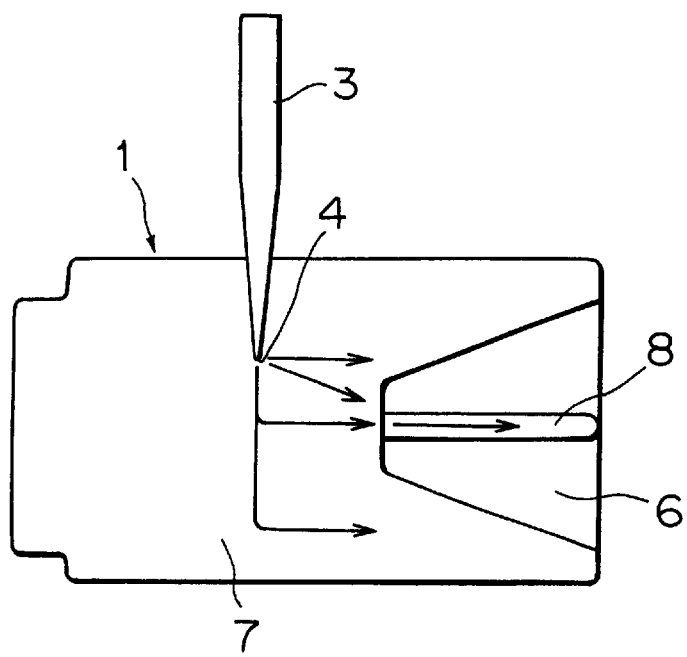
FIG. 6 is a side view of the connector housing, showing flow of resin material at the injection thereof in a manufacturing process of the connector housing.
Figure 7:
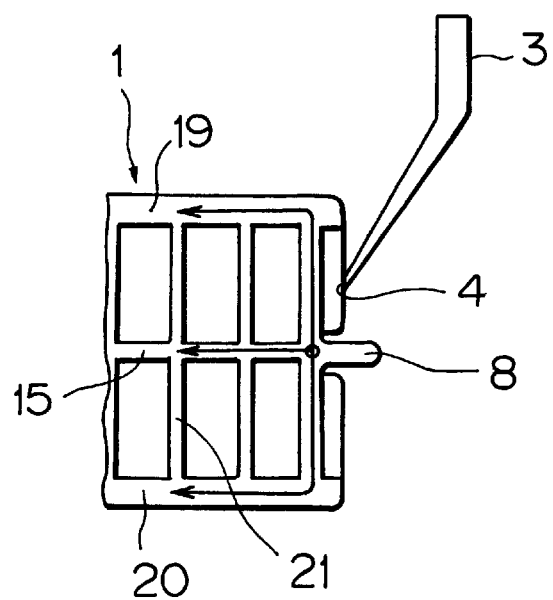
FIG. 7 is a front view of the connector housing, also showing flow of the resin material.
Figure 8:
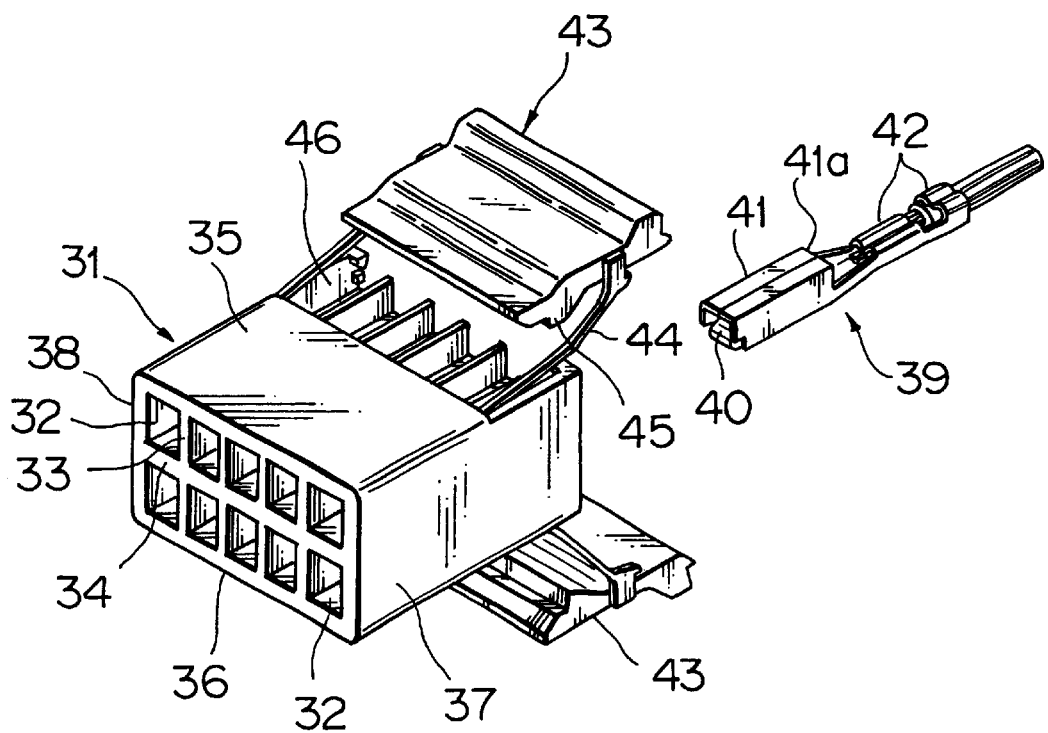
FIG. 8 is a perspective view showing an example of a prior art connector housing.

In FIGS. 6–7, flow of the injected resin material in forming the connector housing 1 is shown.

The resin material is injected to an unshown metal mold from a gate 4 by way of a runner 3. As shown in FIG. 6, the resin material having injected from a gate 4 is introduced into the rib 8 through the thick sidewall portion 7. That is, the above flow is induced due to an existence of the rib 8. Because the resin material flows into the rib 8, the thin sidewall portion 6 spreading over and under the rib 8 can be filled up with the resin material, thereby securely preventing the short shot of the resin material on the thin sidewall portion 6.

Simultaneously, the resin material is introduced into the horizontal partition 15 and the upper and lower wall portions 19,20 from a base portion of the rib 8, as shown in FIG. 7. And, the resin material is also introduced toward the vertical partitions 21 from both of the horizontal partition 15 and the wall portions 19,20. Like this, the induction of the resin material into the above partitions and portions can be securely carried out by means of the rib 8, thereby preventing the short shot of the resin material on the partitions and portions. The above can be recognized effective especially in case the pitch between the terminals is small and therefore thickness of the partitions 15,21 is small.

Otherwise, in case the gate 4 of the runner 3 is arranged on each of the upper and lower wall portions 19,20 of the connector housing 1, the resin material flows: from the upper and lower wall portions 19,20 to the vertical partitions 21; from the vertical partitions 21 to the horizontal partition 15; and from the horizontal partition 15 to the thin sidewall portions 6 in directions toward the respective short shot preventing ribs 8. Because the resin material flows into the ribs 8 finally, the short shot on the partitions 15,21 and on the thin sidewall portions 6 can be securely prevented.

As described above, the short shot preventing rib 8 projects over the outside surface of the thick sidewall portion 7 (FIG. 2). And, the rib 8 continues in a line from the horizontal partition 15. Also, thickness of the rib 8 is larger than that of the horizontal partition 15. Further, the gate 4 can be positioned on the upper and lower wall portions 19,20, not limited to the sidewall 5.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A connector housing comprising:

an outside wall having an upper and lower walls and sidewalls;

horizontal partitions and vertical partitions which form terminal accommodating chambers inside the outside wall; and a thin sidewall portion formed on a longitudinal end of each of the sidewalls and being thinner than a remaining portion of the corresponding sidewall;

wherein a short shot preventing rib is longitudinally formed on the thin sidewall portion integrally therewith in a generally vertical center thereof;

wherein the connector housing is formed by injecting resin into a mold and a resin flow into the rib is induced, whereby a short shot on the thin sidewall portion spreading around the rib is prevented.

2. The connector housing as set forth in claim 1, wherein the short shot preventing rib projects outside over the remaining portion continuing from the thin sidewall portion.

3. The connector housing as set forth in claim 1, wherein the short shot preventing rib is arranged in a line with the horizontal partition.

4. The connector housing as set forth in claim 2, wherein the short shot preventing rib is arranged in a line with the horizontal partition.

5. The connector housing as set forth in claim 3, wherein the short shot preventing rib is formed thicker than the horizontal partition.

6. The connector housing as set forth in claim 4, wherein the short shot preventing rib is formed thicker than the horizontal partition.

* * * * *